US009639484B2

(12) United States Patent
Craske et al.

(10) Patent No.: US 9,639,484 B2
(45) Date of Patent: May 2, 2017

(54) PROVISION OF ACCESS CONTROL DATA WITHIN A DATA PROCESSING SYSTEM (75) Inventors: Simon John Craske, Cambridge (GB); Melanie Emanuelle Lucie Teyssier, Sophia Antipolis (FR); Nicolas Jean Phillippe Huot, Sophia Antipolis (FR); Gilles Eric Grandou, Sophia Antipolis (FR)

(73) Assignee: ARM Limited, Cambridge (GB)

( * ) Notice: Subject to any disclaimer, the term of this patent is extended or adjusted under 35 U.S.C. 154(b) by 994 days.

(21) Appl. No.: 13/881,113

(22) PCT Filed: Sep. 27, 2011

(86) PCT No.: PCT/GB2011/051820
§ 371 (c)(1),
(2), (4) Date: Jul. 12, 2013

(87) PCT Pub. No.: WO2012/056207
PCT Pub. Date: May 3, 2012

(65) Prior Publication Data
US 2013/0290635 A1   Oct. 31, 2013

(30) Foreign Application Priority Data

Oct. 26, 2010  (GB) .................................. 1018013.1
Dec. 13, 2010  (GB) .................................. 1021059.9

(51) Int. Cl.
*G06F 12/00*   (2006.01)
*G06F 12/14*   (2006.01)
*G06F 12/0802*  (2016.01)

(52) U.S. Cl.
CPC ...... *G06F 12/1416* (2013.01); *G06F 12/0802* (2013.01); *G06F 12/1441* (2013.01);
(Continued)

(58) Field of Classification Search
CPC ............. G06F 12/1416; G06F 12/1441; G06F 12/1458; G06F 12/0802; G06F 12/145; Y02B 60/1225
See application file for complete search history.

(56) References Cited

U.S. PATENT DOCUMENTS 4,965,717 A * 10/1990 Cutts, Jr. ............... G06F 9/3824
                                                         711/148
5,850,632 A   12/1998 Robertson
(Continued)

FOREIGN PATENT DOCUMENTS

EP    1 870 815    12/2007
GB    2 325 061    11/1998

OTHER PUBLICATIONS

International Search Report for PCT/GB2011/051820 mailed Feb. 8, 2012.
(Continued)

*Primary Examiner* — Kalpit Parikh
(74) *Attorney, Agent, or Firm* — Nixon & Vanderhye P.C.

(57) ABSTRACT

A data processing system (2) includes memory protection circuitry (10) storing access control data for controlling accesses to data at memory addresses within a main memory (16). An access control cache (14) may, in one embodiment, store access control data when the access control data is indicated by the memory protection circuitry (10) to be cachable. In another embodiment access control data is stored within the access control cache with determined address range data for reach determination of access control data by the memory protection circuitry. If the access control cache (14) is storing access control data for a memory access request, then the access control data stored within the access control cache (14) is used in place of access control data retrieved form the memory protection circuitry (10). In the first embodiment, access control data may be determined to
(Continued)

be cachable is if is associated with a region of memory addresses within a plurality of hierarchically ordered memory addresses that is a highest order region which encompasses all the memory addresses within that region.

27 Claims, 9 Drawing Sheets

(52) U.S. Cl.
CPC ........ *G06F 12/1458* (2013.01); *G06F 12/145* (2013.01); *Y02B 60/1225* (2013.01)

(56) References Cited

U.S. PATENT DOCUMENTS

| | | |
|---|---|---|
| 6,021,476 A | 2/2000 | Segars |
| 7,068,545 B1 | 6/2006 | Kimelman et al. |
| 7,287,140 B1 | 10/2007 | Asanovic et al. |
| 2004/0078516 A1 | 4/2004 | Henderson et al. |
| 2006/0265561 A1* | 11/2006 | Boyd .................... G06F 3/0619 711/163 |
| 2008/0005513 A1 | 1/2008 | Lim |

OTHER PUBLICATIONS

Written Opinion of the International Searching Authority mailed Feb. 8, 2012.
Search Report for GB 1018013.1 dated Feb. 15, 2011.
Search Report for GB 1021059.9 dated Apr. 5, 2011.

* cited by examiner

PROVISION OF ACCESS CONTROL DATA WITHIN A DATA PROCESSING SYSTEM

This application is the U.S. national phase of International Application No. PCT/GB2011/051820 filed 27 Sep. 2011 which designated the U.S. and claims priority to GB 1018013.1 filed 26 Oct. 2010, and GB 1021059.9 filed 13 Dec. 2010, the entire contents of each of which are hereby incorporated by reference.

This invention relates to the field of data processing systems. More particularly, this invention relates to the provision of access control data for controlling access to data values stored within a memory of a data processing system.

It is known to provide data processing systems with memory protection units. Examples of such memory protection units are those designed by ARM Limited of Cambridge, England. Such memory protection units allow a plurality of regions of memory address space to be defined and to have access control data associated therewith. This access control data may, for example, specify in which modes of operation the data processing system must be in order to access data within those regions as well as characteristics of the handling of data values within those regions, such as whether accesses to those regions are cachable, bufferable etc. The plurality of regions may be arranged to have a hierarchical ordering therebetween. The regions may overlap one another and have holes within them. A controlling region which provides the access control data to be used in respect of a memory address is the region having the highest position within the hierarchical ordering which encompasses that memory address. Such an arrangement allows sophisticated partitioning of the memory address space into different regions with different access control data associated therewith using relatively little data to specify the regions thereby permitting rapid programming and a low storage overhead associated with defining of the plurality of regions.

While the use of such a hierarchical ordering between a plurality of regions has the advantages discussed above, it suffers from the disadvantage that when it is desired to determine the access control data for a particular memory address to be accessed it is generally necessary to query the memory protection circuitry storing all of the access control data for the plurality of regions such that the controlling region which is to provide the access control data for the memory address concerned can be identified from among the plurality of regions with their complex hierarchical ordering and overlapping relationships. This is a processing bottleneck and disadvantageously computationally intense.

Viewed from one aspect the present invention provides an apparatus for processing data comprising:

memory protection circuitry configured to store access control data for a plurality of regions of memory address space within a memory, said plurality of regions having a hierarchical ordering there between, said memory protection circuitry:

(i) determining, in response to a memory access request to a target memory address received by said memory protection circuitry, a controlling region within said plurality of regions, said controlling region having a highest position within said hierarchical ordering of any of said plurality of regions encompassing said target address; and (ii) returning access control data for said controlling region for controlling access to said memory by said memory access request; and an access control cache coupled to said memory protection circuitry and configured to store access control data returned from said memory protection circuitry and to provide said access control data for said memory access request in place of said memory protection circuitry when said access control cache is storing said access control data for said memory access request.

The present technique recognises that even though memory protection circuitry operates with a plurality of regions having a hierarchical ordering permitting overlapping regions, it may nevertheless be possible to cache access control data within an access control cache from where it may be read more rapidly and using less energy. When the access control data is stored within the access control cache, the memory protection circuitry returns address range defining signals for defining a range of memory address space within the memory for which the access control data being returned can be used to control memory accesses.

In some embodiments said memory protection circuitry when returning said access control data also generates:

(a) a cachability signal indicative of whether or not said access control data is eligible to be stored in said access control cache; and (b) at least when said cachability signal indicates said access control data is eligible to be stored in said access control cache, address range defining signals for defining a range of memory address space within said memory for which said access control data controls access to said memory by memory access requests.

The caching of the access control data is facilitated by arranging the memory protection circuitry such that, when this returns access control data in response to a memory access request, it also generates a cachability signal indicative of whether or not the access control data being returned is eligible to be stored within the access control cache. This technique recognises and exploits the insight that while it may not be practical to store within the access control cache all access control data returned due to the difficulty and complexity of determining the address range defining signals in all cases, there are a significant number of circumstances in which the access control data being returned is associated with a range of addresses that can be relatively easily determined and accordingly stored within the access control data such that future memory access requests requiring that control data can obtain it from the access control cache in place of a look-up being necessary in the memory protection circuitry. If the plurality of regions are programmed with a view to facilitating the generation of the address range defining signals in many cases, then the usefulness of the access control cache can be enhanced and both processing speed and energy consumption can be improved.

One example criteria for judging whether or not the cachability signal should indicate that access control data is eligible to be stored within the access control cache is whether or not the controlling region encompasses any memory addresses that are also encompassed within one or more other regions having a higher position within the hierarchical ordering than the controlling region. If the controlling region is effectively overlapped by one or more other regions having a higher position within the hierarchical ordering, then it is not possible to simply use the data defining the address range of the controlling region to specify directly the address range within the memory address space where the access control data for the controlling region will be applied since for at least the overlapped addresses this address control data will be overridden by the address control data of the regions higher in the hierarchical ordering.

Another criteria which may be used to determine eligibility for storage within the access control cache is whether or not the controlling region is a non-continuous region, i.e. has holes within it. If the controlling region is non-contiguous, then it will not be eligible to have its access control data stored within the access control cache since its address range defining signals will be difficult to determine and then generically represent within the access control cache.

While it is possible that the cachability signal may be determined by analysing the relationship of the plurality of regions each time a memory access request is made, in other embodiments the memory protection unit itself may be configured to store cachability data for each region to indicate whether or not access control data for that region is eligible to be stored within the access control cache. The cachability signal can then be generated in dependence upon this cachability data for the controlling region identified.

The memory protection circuitry may include analysis circuitry for determining the cachability data for each of the plurality of regions. This analysis circuitry may operate autonomously of the memory protection circuitry responding to received memory access requests and may be powered down when it is not needed as the cachability data has already been determined. The analysis circuitry may be provided in the form of non-programmable finite state machine circuitry.

The analysis circuitry may determine the cachability data in some embodiments by comparing each region of the plurality of regions with, in turn, all other regions of the plurality of regions.

In order to deal with changes made to the access control data stored within the memory protection circuitry, the access control cache may be flushed whenever the access control data stored within the memory protection circuitry is written.

In a similar way, the cachability data may be determined whenever the access control data stored within the memory protection circuitry is written such that changes to the cachability data will be made to reflect the changes in the access control data.

Whilst the present techniques have use in a plurality of situations within a data processing system, they are well suited to use in systems having a cache memory configured to store program instructions from a main memory with the access control cache storing access control data for cache lines fetched into the cache memory.

While the address range defining signals could take a variety of different forms, forms which are compact and well suited to such use are those when the address range defining signals specify one of a base address of the controlling region and the size of the controlling region or a base address of the controlling region and a mask value for applying to a memory address to determine in conjunction with the base address if a memory address is within the controlling region.

As previously mentioned, the address control data could specify a number of different parameters, such as in which of a plurality of hardware modes the data at a memory address is accessible and attributes concerning that data such as whether the data is readable, writable, and/or executable.

In some embodiments the form of the regions may be such that address range defining signals can be generated by the memory protection circuitry when returning the access control data and accordingly the memory protection circuitry when returning the access control data also generates address range defining signals for defining a range of memory address space within the memory for which the address control data controls access to the memory by memory access requests. Thus, in such embodiments, the cachability signal is not required.

One form of such embodiments serve to simplify the determination of the range of memory address space by arranging that the memory protection unit is configured to determine, for each of at least those of a plurality of regions having a higher position within the hierarchical ordering than the controlling region, a non-overlap size of the address range that will not overlap therewith. The non-overlap size of the address range is not necessarily the maximum size that the address range may have without overlapping any higher order regions, but is an address range for which the access control data is valid.

The non-overlap size could be determined for only those regions higher in the hierarchical ordering, however, in some embodiments, it is convenient to determine in parallel the non-overlap size for all of the plurality of regions. Such a parallel determination can be readily achieved in hardware at high speed.

The non-overlap size may be determined for at least any higher order regions and the range of memory address space may be set to be the smallest of any of the non-overlap size associated with the higher order regions.

In some embodiments said target address is an X-bit address of value TA and each of said plurality of regions has a size of $2^W$ and a base address of $B*2^W$, where W is a positive integer and B is a positive integer.

If a region is not enabled, then the non-overlap size for that region may be set to be $2^X$.

If a region is enabled and the target address is not within that region, then the non-overlap size for the region is given by $2^A$ where A is ((X−1)−CLZ) and CLZ is a count value of leading zeros within (TA XOR $B*2^W$).

If a region is enabled and contiguous with the target address not being within the region, then the non-overlap size for the region is set as $2^W$.

If a region is enabled and is divided into $2^S$ sub-regions, each with a size of $2^W/2^S$, where S is a positive integer, then said non-overlap size for said region is $2^W/2^S$.

In addition to determining in parallel the non-overlap size for each region, the memory protection circuitry may also determine in parallel for each region if the region is the controlling region for the target address. The parallel determination of the controlling region and the non-overlap size may be conveniently performed within the same hardware structures.

Having determined the non-overlap size and the controlling region in parallel, the memory protection circuitry may be configured to read, in their hierarchical order, results of these parallel determinations until the results for the controlling region are read and then to set the non-overlap size to a smallest non-overlap size of any of the regions for which the results have been read.

The address range defining signals may take a variety of different forms. In some embodiments the address range defining signals specify a target address and a mask value and the address control cache is configured such that a new target address is matched to stored access control data if the target address masked with the mask value for the stored access control data matches the new target address when masked with the mask value for that stored access control data.

In some embodiments, the access control cache may also be used to store access control data returned from memory management circuitry configured to read page table data stored within the memory to generate access control data for a memory access request when the memory protection circuitry is not able to generate that access control data.

The memory protection circuitry may not be able to generate the access control data for a variety of different reasons including that none of the plurality of regions defined within the memory protection circuitry encompass the target address concerned (i.e. a miss within the memory protection circuitry) or that the memory protection circuitry is disabled.

Viewed from another aspect the present invention provides an apparatus for processing data comprising:

memory protection means for storing access control data for a plurality of regions of memory address space within memory means for storing data, said plurality of regions having a hierarchical ordering therebetween, said memory protection means:

(i) determining, in response to a memory access request to a target memory address received by said memory protection means, a controlling region within said plurality of regions, said controlling region having a highest position within said hierarchical ordering of any of said plurality of regions encompassing said target address; and (ii) returning access control data for said controlling region for controlling access to said memory means by said memory access request; and access control cache means coupled to said memory protection means for storing access control data returned from said memory protection means and for providing said access control data for said memory access request in place of said memory protection means when said access control means is storing said access control data for said memory access request.

Viewed from a further aspect the present invention provides a method of controlling access to data comprising the steps of:

storing within memory protection circuitry access control data for a plurality of regions of memory address space within a memory, said plurality of regions having a hierarchical ordering therebetween;

determining with said memory protection circuitry, in response to a memory access request to a target memory address received by said memory protection circuitry, a controlling region within said plurality of regions, said controlling region having a highest position within said hierarchical ordering of any of said plurality of regions encompassing said target address;

returning from said memory protection circuitry access control data for said controlling region for controlling access to said memory by said memory access request;

storing within an access control cache coupled to said memory protection circuitry access control data returned from said memory protection circuitry; and providing said access control data for said memory access request from said access control cache in place of said memory protection circuitry when said access control cache is storing said access control data for said memory access request.

Embodiments of the invention will now be described, by way of example only, with reference to the accompanying drawings in which.

Figure 1:
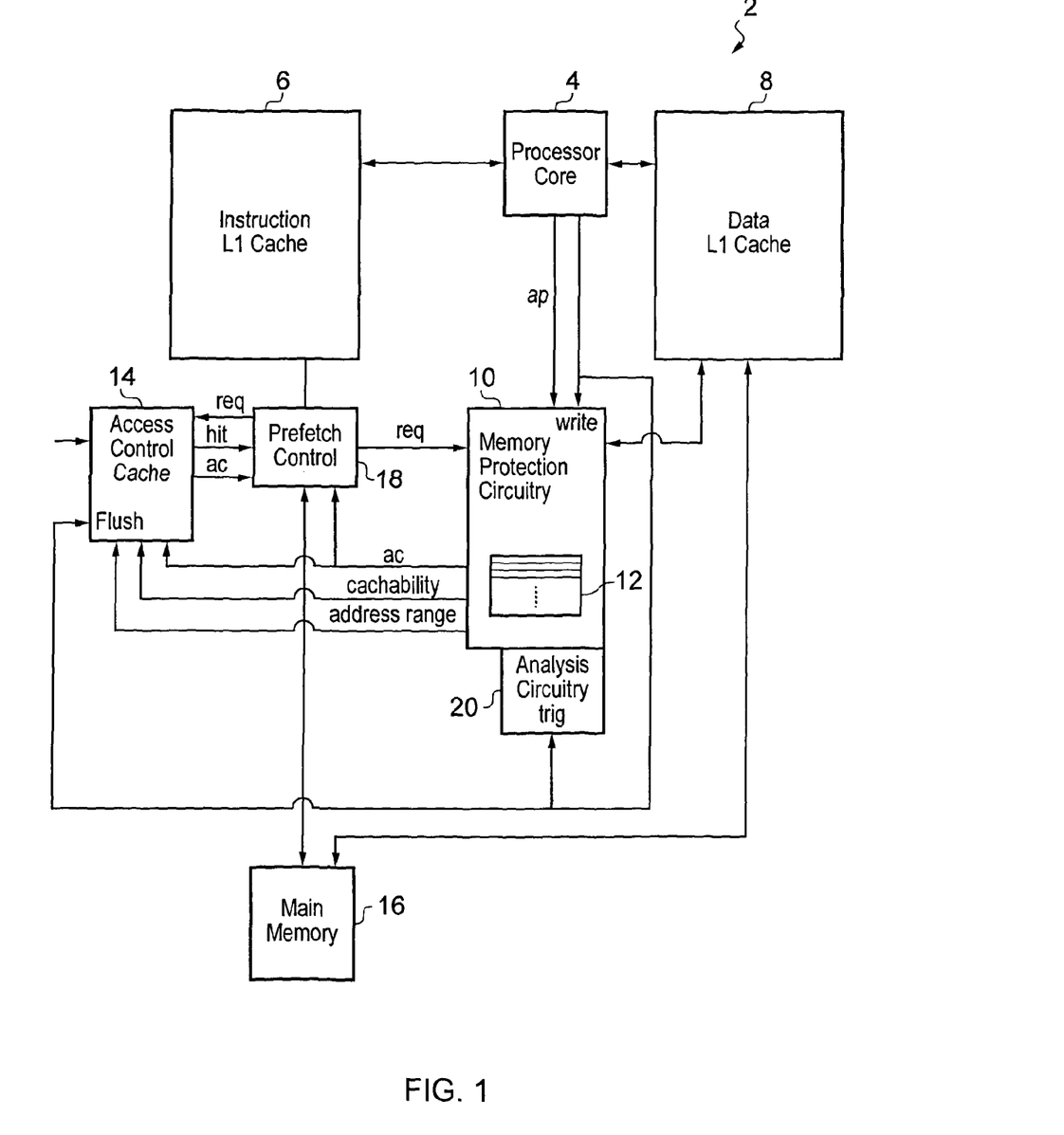
FIG. 1 schematically illustrates a data processing system including memory protection circuitry and an access control cache.

FIG. 1 schematically illustrates a processing system 2 including a processor core 4 executing a stream of program instructions. The processor core 4 is coupled to an instruction cache 6 and a data cache 8. Memory protection circuitry 10 stores access control data 12. Portions of this access control data 12 which are cachable may be stored within an access control cache 14. If instructions or data are not present within the respective one of the instruction cache 6 and the data cache 8, then they are fetched from a main-memory 16.

The embodiment illustrated in FIG. 1 focuses upon the use of the memory protection circuitry 10 and the access control data 12 upon the instruction fetching side of the system. It will be appreciated that similar techniques may be used on the data side, but these have not been illustrated in FIG. 1 for the sake of simplicity.

Prefetch circuitry 18 coupled to the instruction cache 6 serves to generate memory access requests to the main memory 16 to prefetch cache lines into the instruction cache 6. The operation of such prefetch control circuitry 18 will be familiar to those in this technical field as will the strategies and techniques which may be employed to effectively prefetch instructions into an instruction cache prior to them being needed by the processor core 4.

The access control cache 14 is coupled to the prefetch control circuitry 18. When the prefetch control circuitry 18 initiates a cache line fetch it sends the memory access request to the access control cache 14 where a determination is made as to whether or not the access control data for the address specified within the memory access request is stored within the access control cache 14. If there is a hit within the access control data stored within the access control cache 14, then this is indicated by a hit signal back to the prefetch control circuitry 18 and the access control data is returned to the prefetch control circuitry 18. Since the operation of the access control cache 14 is a relatively straightforward lookup operation within a relatively small number of entries representing cached access control data, it may be performed rapidly and with relatively little energy consumption. If the access control cache 14 is storing the needed access control data, then a considerable saving in time and energy may be achieved. Furthermore, when a sequence of accesses are to the same area then this process need only be performed once.

If the access control cache 14 does not return a hit signal indicating that the access control data required by the memory access request is not present within the access control cache 14, then the memory access request is issued to the memory protection circuitry 10 where it is compared with the full set of access control data 12. The access control data for the memory access request is then returned to the prefetch control circuitry 18 as well as being passed to the access control cache 14. The memory protection circuitry 10 also returns a cachability signal indicating whether or not the access control data being returned is suitable for caching within the access control cache 14. If the cachability signal indicates that the access control data is suitable for caching within the access control cache 14, then address range signals output from the memory protection circuitry 10 indicating the range of addresses for which the access control circuitry being returned should be used are also stored within the access control cache 14 together with the access control data to which they relate. Thus, when the cachability signal so indicates, the access control cache 14 stores both the access control data and its associated address range data such that, when a memory access request is received by the access control cache 14 from the prefetch control circuitry 18, a comparison of the address associated with the memory access request with the range of addresses for which the stored access control data is applicable may be made and accordingly a hit signal generated to indicate whether or not the relevant access control data is stored within the access control cache 14.

The prefetch control circuitry 18 uses the access control data it has retrieved from either the access control cache 14 or the memory protection circuitry 10 to control whether or not it performs the cache line fetch operation concerned. It may be that the access control data indicates that in a current mode of operation (e.g. one of a user mode, a privileged mode, and/or a hypervisor mode) the data concerned is not accessible as well as other access controlling parameters such as whether or not the data is readable, writable, or executable.

While the example embodiment of FIG. 1 (and FIG. 7) illustrate the use of the access control data by the prefetch control circuitry, it will be appreciated that other uses are possible. As an example, access control data may additionally or alternatively be used to determine both Data-cache cacheability and bufferability.

The access control data 12 within the memory protection circuitry 10 is written into the memory protection circuitry 10 by the processor core 4. When the processor core 4 writes to the access control data 12 within the memory protection circuitry 10, this triggers a flush operation of all the access control data stored within the access control cache 14 as well as triggering analysis circuitry 20 associated with the memory protection circuitry 10 to recalculate cachability data associated with the access control data 12 within the memory protection circuitry 10 as will be discussed later.

Figure 2:
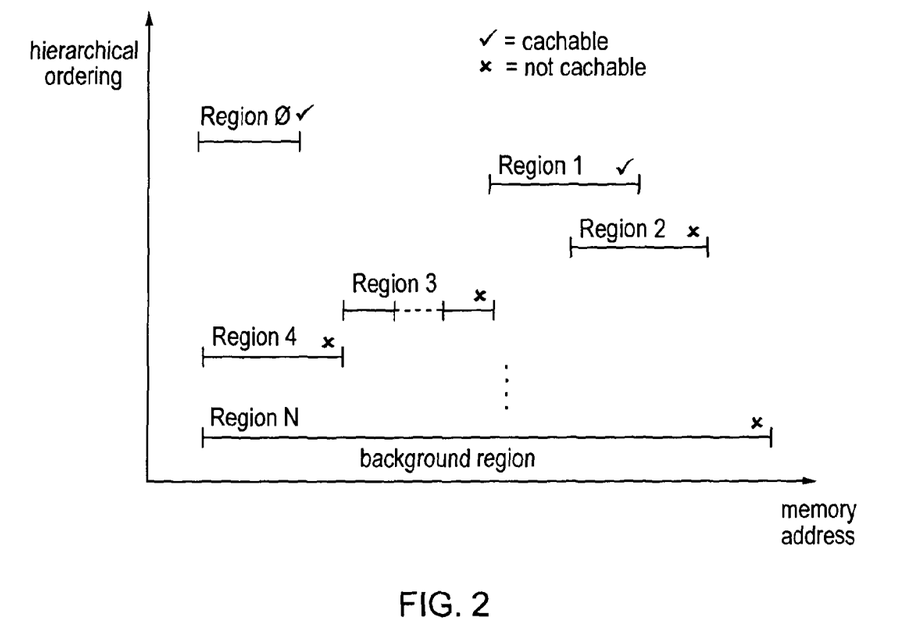
FIG. 2 schematically illustrates an example of a plurality of regions with associated access control data having a hierarchical ordering therebetween.

FIG. 2 schematically illustrates a plurality of regions of memory addresses for which associated access control data is defined. These regions of memory addresses are arranged in a hierarchical ordering with regions higher in the ordering (with a lower number and toward the top of FIG. 2) having precedence over regions lower in the hierarchical ordering. Thus, to determine the access control data to be returned for a memory access request it is necessary to determine which is the highest in the hierarchical order of any of the plurality of regions which encompasses the memory address concerned. It is this region which is the controlling region for the memory access concerned.

Also illustrated in FIG. 2 is an indication of whether or not each of the regions is cachable within the access control cache 14. A region is considered cachable if it does not encompass any memory addresses which are also encompassed within other memory regions that are higher in the hierarchical ordering, i.e. it is the highest in the hierarchical ordering of all the regions which encompass any of its memory addresses. Furthermore, in order for a region to be cachable it must be contiguous. Thus, for example, Region 3 is non-contiguous (it includes a gap) and accordingly is not cachable within the access control cache 14.

Figure 3:
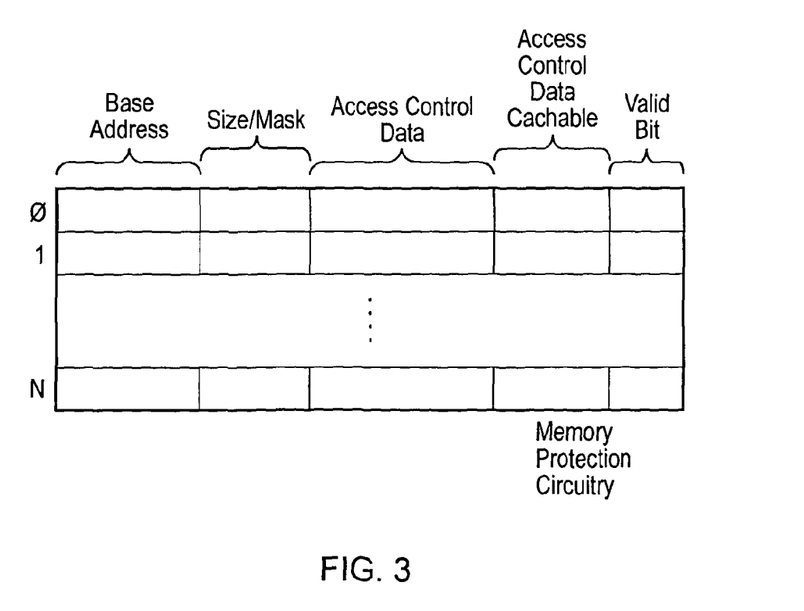
FIG. 3 schematically illustrates access control data stored within the memory protection circuitry and including cachability data specifying whether the access control data concerned is cachable.

FIG. 3 schematically illustrates access control data as may be stored within the memory protection circuitry 10. This access control data defines the regions using a base address and a size (or a mask value to be combined with the base address to determine which addresses fall within the region) as well as the access control data itself (e.g. which modes may access those addresses, whether the data is cachable, bufferable, executable, etc.) and the cachability data indicating that the region concerned holds access control data that is cachable. Each line within the access control data also includes a valid bit indicating whether or not that line is storing valid data.

Figure 4:
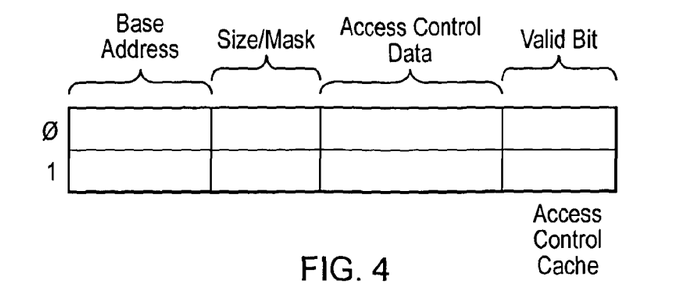
FIG. 4 schematically illustrates access control data as stored within the access control cache.

FIG. 4 schematically illustrates access control data as may be stored by the access control cache 14. In some embodiments the access control cache 14 may only store two lines of access control data. The access control data is the same as that shown in FIG. 3 except that the cachability data need not be stored within the access control cache since all entries within the access control cache must be cachable in order to have been stored within the access control cache 14. Each line within the access control data also includes a valid bit indicating whether or not that line is storing valid data.

Figure 5:
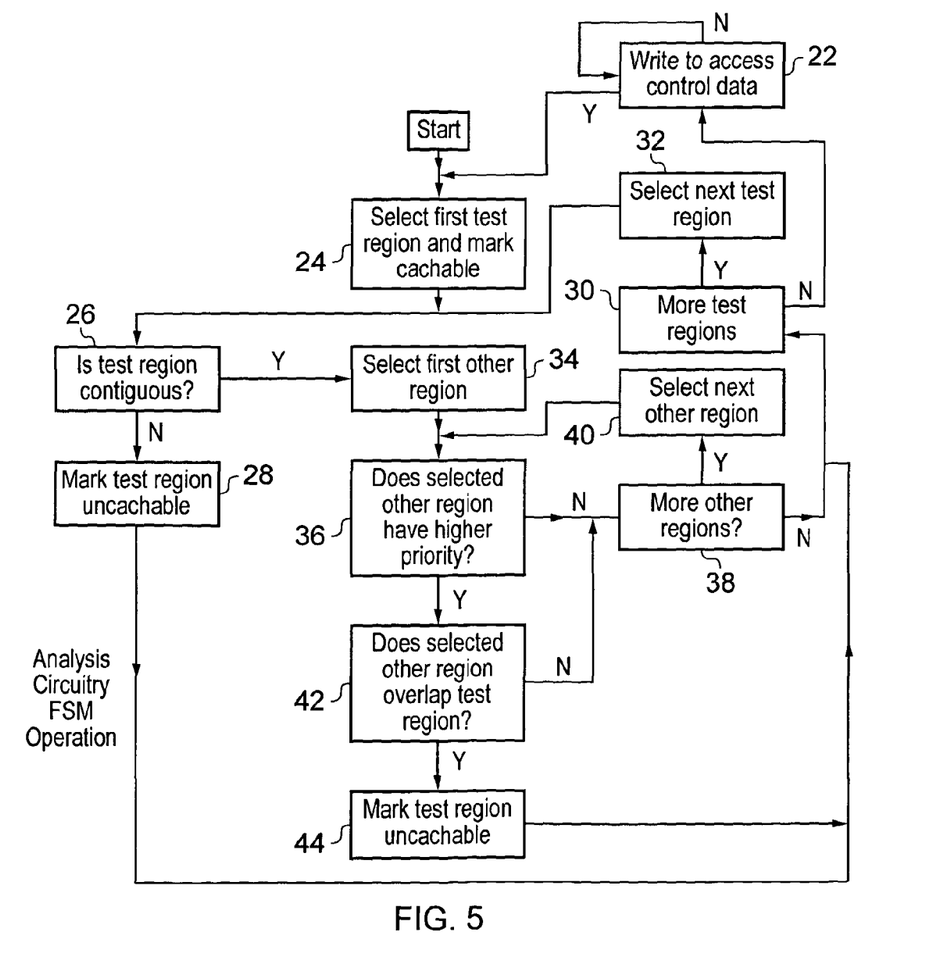
FIG. 5 is a flow diagram schematically illustrating the operation of analysis circuitry in the form of a finite state machine to determine cachability data.

As previously mentioned, the analysis circuitry 20 coupled to the memory protection circuitry 10 serves to analyse the access control data 12 stored within the memory protection circuitry 10 whenever this is written. This ensures that the cachability data is refreshed whenever there is a change to the access control data. Upon power up of the system, or when a write to the access control data is detected at step 22, processing proceeds to step 24 where a first test region for which the cachability data is to be determined is selected. This first test region is first marked as cachable. Step 26 then determines whether or not the region is contiguous. If the region is not contiguous, then step 28 marks the test region as uncachable and processing proceeds to step 30 where a determination is made as to whether or not there are any more test regions for which cachability data is to be determined. If there are further regions, then step 32 selects the next test region and processing returns to step 26. If there are no further test regions for which cachability data is to be determined, then processing returns to step 22 where the system waits until the next write takes place to the access control data.

If the determination at step 26 is that the test region is contiguous, then processing proceeds to step 34 where the first other region within the plurality of regions that does not include the test region is selected. Step 36 then determines whether or not the selected other region has a higher priority than the test region. If the selected other region does not have a higher priority, then it cannot influence the cachability of the test region and so processing passes to step 38 where a determination is made as to whether or not there are any further other regions which need to be considered. If there are no further other regions to be considered then processing proceeds to step 30. If there are further regions to be considered, then the next of these is selected at step 40 and processing returns to step 36.

If the determination at step 36 is that the other region does have a higher priority than the test region, then it could potentially influence the cachability of the test region. Accordingly, step 42 determines whether or not the selected other region overlaps the test region. If the selected other region does not overlap the test region, then it cannot effect its cachability and processing proceeds to step 38 for any further other regions to be selected. If the determination at step 32 is that the selected other region does overlap the test region, then the selected other region is both higher in priority than the test region and overlaps the test region. Accordingly, step 44 serves to mark the test region as uncachable (i.e. sets the cachability data which will in turn result in generation of the cachability signal) before processing proceeds to step 30. If a test region is uncachable for any reason, then there is no point determining any further reason for that test region to be uncachable.

Figure 6:
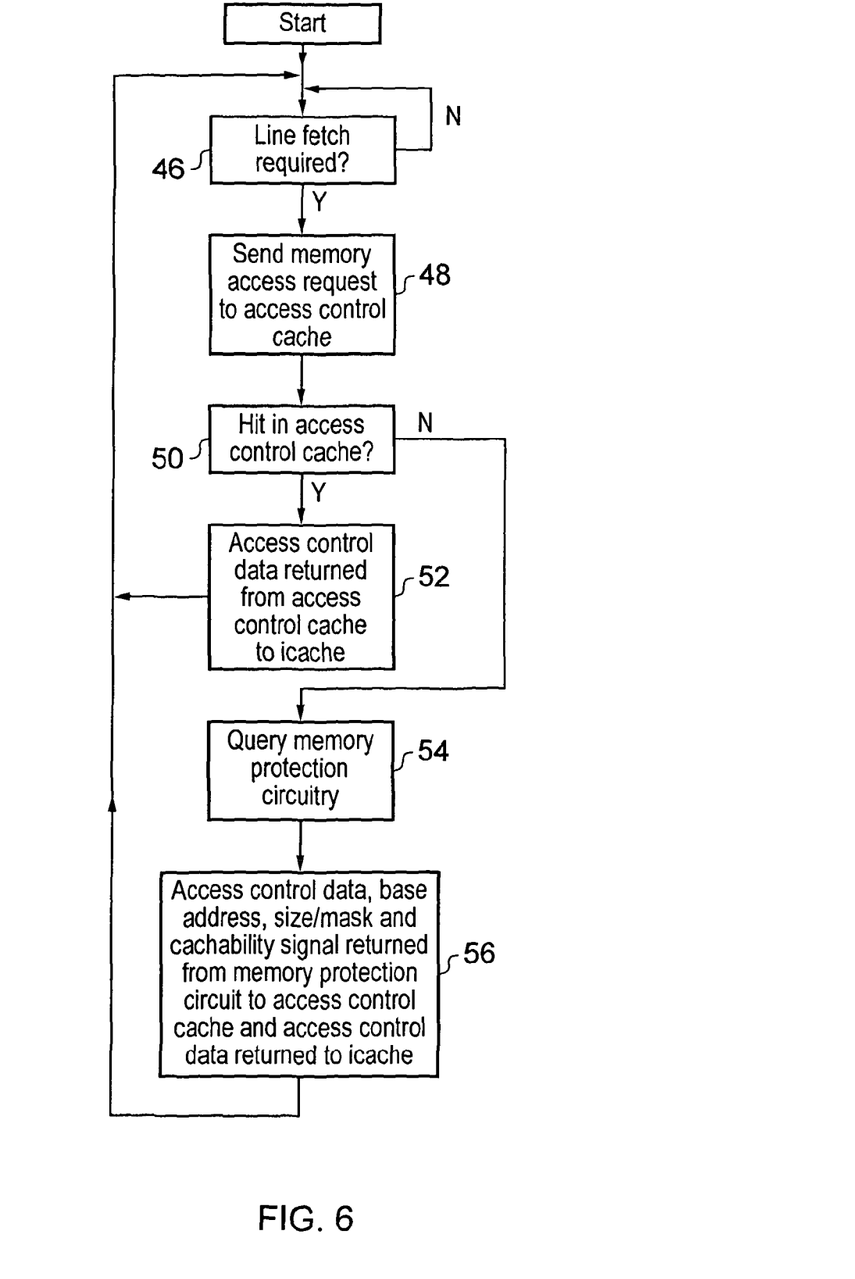
FIG. 6 is a flow diagram schematically illustrating use of the access control cache.

FIG. 6 schematically illustrates the use of the access control data by the prefetch circuitry 18. At step 46 a determination is made as to whether or not a line fetch is required. If a line fetch is required, then step 48 sends the memory access request to the access control cache 14. If there is a hit within the access control cache 14 as determined at step 50, then step 52 returns the access control data from the access control cache 14 to the prefetch control circuitry 18 for use by the instruction cache 6.

If the determination at step 50 is that the there was no hit within the access control cache 14, then step 54 sends the memory access request to the memory protection circuitry 10 where a query is executed to determine the access control data for that memory access request. At step 56 the access control data, base address, size (or mask) of the region associated with the access control data and a cachability signal are returned from the memory protection circuit 10 to the access control cache 14. The access control data is also returned to the prefetch control circuitry 18 for use by the instruction cache 6.

Figure 7:
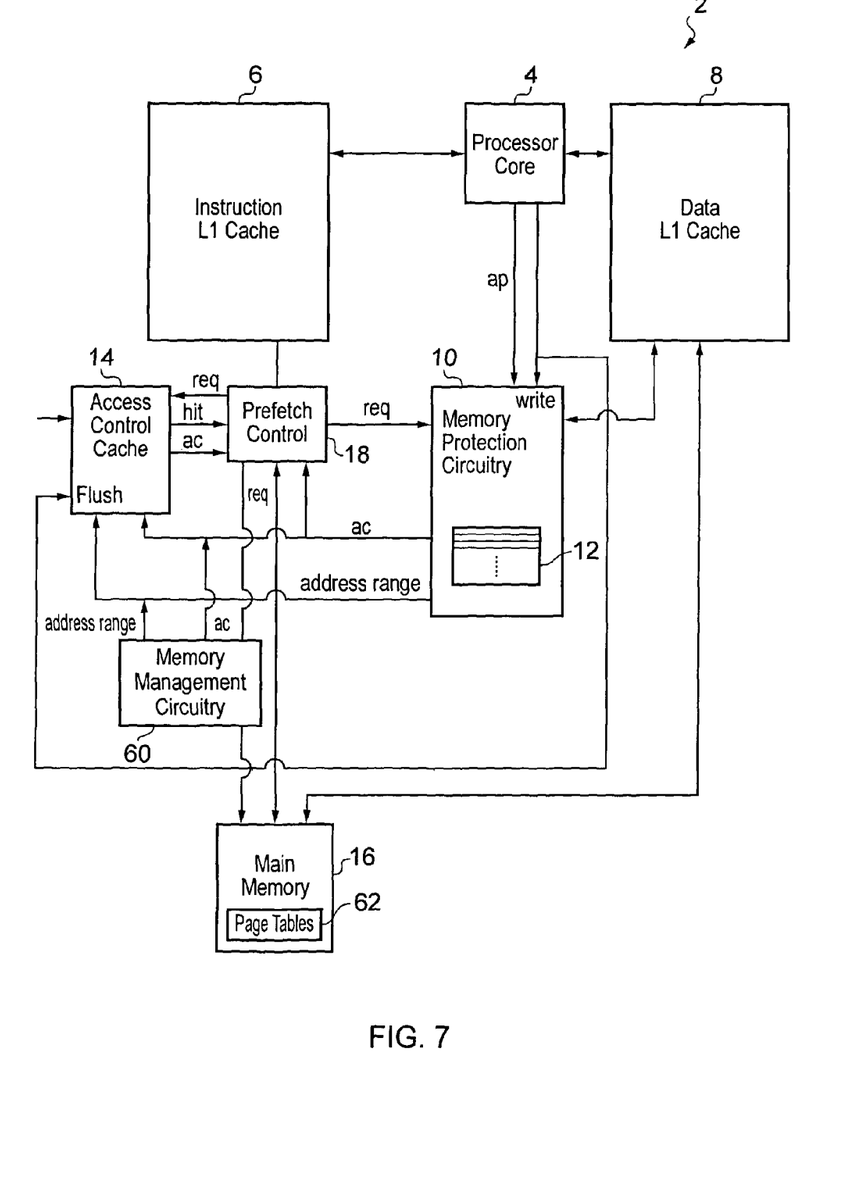
FIG. 7 schematically illustrates a further embodiment of a data processing system including memory protection circuitry, an access control cache and a memory management circuitry.

FIG. 7 schematically illustrates another embodiment of a data processing system including memory protection circuitry 10, memory management circuitry 60 and an access control cache 14. The embodiment of FIG. 7 is similar to the embodiment of FIG. 1 and like items are denoted with the same reference numerals. Compared to the embodiment of FIG. 1, the memory protection circuitry 10 in the embodiment of FIG. 7 returns address range defining signals defining a range of memory addresses together with each set of access control signals returned following a query of the memory protection circuitry 10. Accordingly, the cachability signal is not required in this embodiment since address range signals accompany all access control signals.

This embodiment additionally includes memory management circuitry 60 which reads page table data 62 stored within the main memory 16 to perform page table walks to determine access control data when the memory protection circuitry 10 is not able to return the access control data. The memory protection circuitry 10 may be disabled in some modes of operation or may not have regions defined therein which encompass a particular target address. For example, a portion of the memory address space may be managed by the memory protection circuitry 10 whilst another portion may be managed by the memory management circuitry 60. The memory management circuitry 60 returns access control signals and address range signals to the access control cache 14 where they are stored. The prefetch control circuitry 18 operates in the same way to issue a request to the access control cache 14 for the access control data for a new line of instructions to be fetched to the instruction cache 6. If a hit signal is not returned from the access control cache 14, then the prefetch control circuitry 18 issues a request to either the memory protection circuitry 10 or the memory management circuitry 60.

In this embodiment the memory protection circuitry 10 includes circuitry which determines for each request seeking access control data the address range data associated therewith. This address range data may not specify the maximum address range which can be associated with the returned access control data, but does represent a valid address range that is associated therewith. The memory protection circuitry 10 includes circuitry which determines a non-overlap size for each region in parallel as well as determining whether or not that region is the controlling region and then sequentially processes the results of these parallel determinations to identify the smallest non-overlap size associated with any of the regions higher in the hierarchical order than the controlling region and the controlling region itself.

Figure 8:
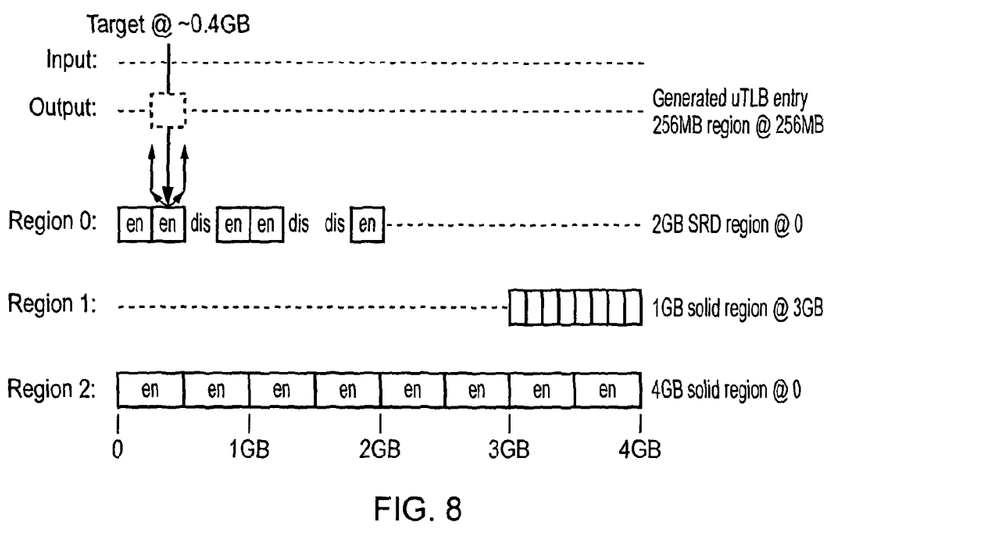
FIG. 8 schematically illustrates a hit in a non-overlapped region with active sub-region-disables (SRDs) stored within memory protection circuitry.

FIG. 8 schematically illustrates a plurality of regions as managed by the memory protection circuitry 10. The highest order region is a 2 GB region which includes $2^S$ selective-region-disable sub-sections. The entire memory address space has size 4 GB ($2^X$) in accordance with the 32-bit addresses (X=32) used to address the memory address space. The region 0 has a size $2^W$ corresponding to 2 GB (W=31). The next region within the hierarchy is region 1 and has a size of 1 GB (W=30). The lowest region in the hierarchy is a background region (region 2) which completely fills the memory address space and has a size 4 GB (W=32).

In the case of the target address TA illustrated in FIG. 8 a hit occurs within region 0 which is a non-overlapped region containing active sub-region-disables. The memory protection circuitry 10 identifies region 0 as enabled and as divided into sub-regions. There are $2^S$ of these sub-regions (in this example S=3). The non-overlap size which is returned in association with the access control signals for the hit by the target address is reduced to the size of the width of the region 0 ($2^W$) divided by the number of sub-regions present ($2^S$). In the specific example of FIG. 8, the request for the access control data using a target address of around 0.4 GB returns the access control data and address range data defining a range of memory addresses with a contiguous size of 256 MB for which the returned access control data will be taken as valid when stored within the access control cache 14.

The access control cache 14 stores the target address TA which was used to access that access control data together with a mask value indicating the range of memory addresses for which that access control data is valid. In particular, when a new target address is encountered, then it is deemed to match the stored access control data if the target address TA originally used to return that access control data when masked with the stored mask value produces a result which is the same as when the new target address is masked with that stored mask value. The masking may be an AND operation.

Figure 9:
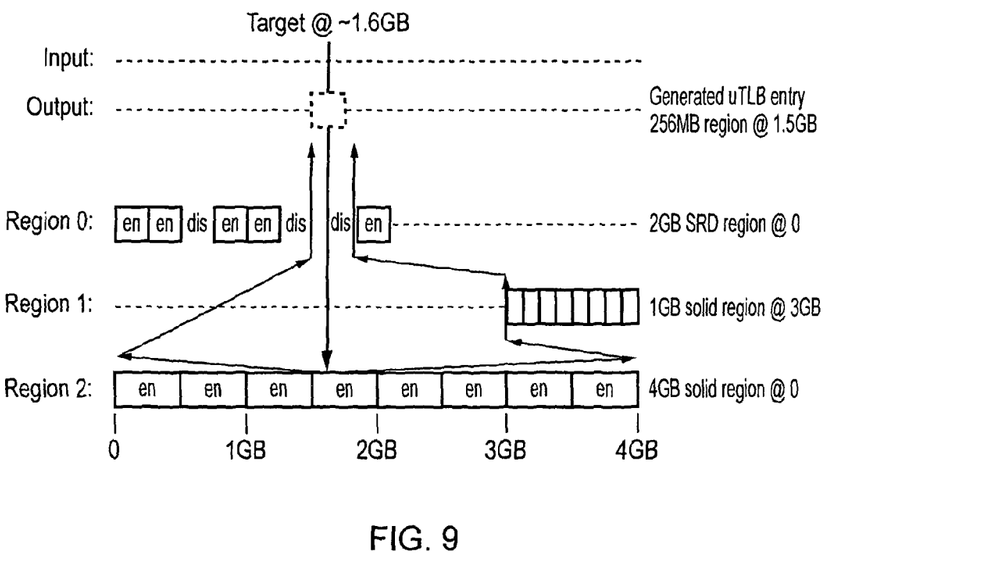
FIG. 9 illustrates a hit within an overlapped region which passes through an active sub-region-disable.

FIG. 9 illustrates the same plurality of regions as FIG. 8, but in this case seeking to return access control data associated with a target address of approximately 1.6 GB. In this case, the target address does not hit within region 0 as it passes through an active sub-region-disable and instead hits within the lowest order region, namely region 2. The determination of the address range signals to be associated with the returned access control data is based upon a non-overlap size associated with all of the regions of higher order than the controlling region and including the controlling region. Thus, the smallest non-overlap size within any of these regions active in controlling the address range signals is the non-overlap size associated with region 0. Thus, the access control data returned in the example of FIG. 9 is also 256 MB, as this is the smallest non-overlap size of any of the regions which affect the target address.

Figure 10:
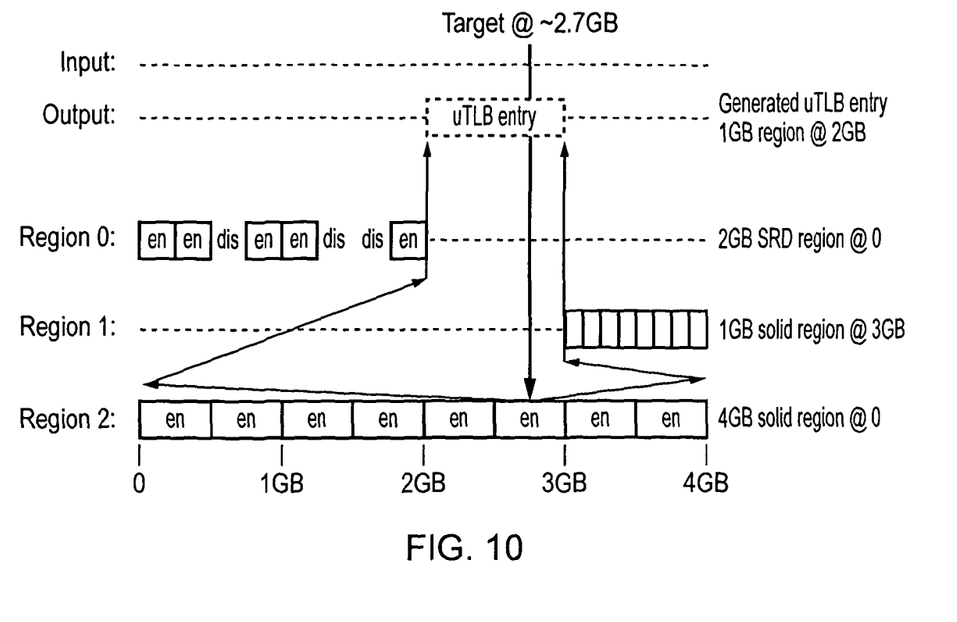
FIG. 10 schematically illustrates a hit within a region which is overlapped by a region of higher priority.

FIG. 10 illustrates the situation when the target address is approximately 2.7 GB. In this example the target address is outside region 0. The non-overlap size for this enabled region which is missed is given by $2^A$, where A is ((X−1)−CLZ) and CLZ is a count value of leading within (TA XOR B*$2^W$). In respect of region 0 which is missed, this count leading zeros determination has a size of 2 GB. In the case of region 1 which is also missed, this count leading zeros determination has a size of 1 GB. The target address hits within region 2, which is the controlling region for the target address concerned. The non-overlap size for this controlling region is the same as the size of the controlling region, and in this example is 4 GB. The smallest of the non-overlap size associated with any of the regions 0, 1 and 2 which influence the target address is 1 GB as associated with region 1.

Figure 11:
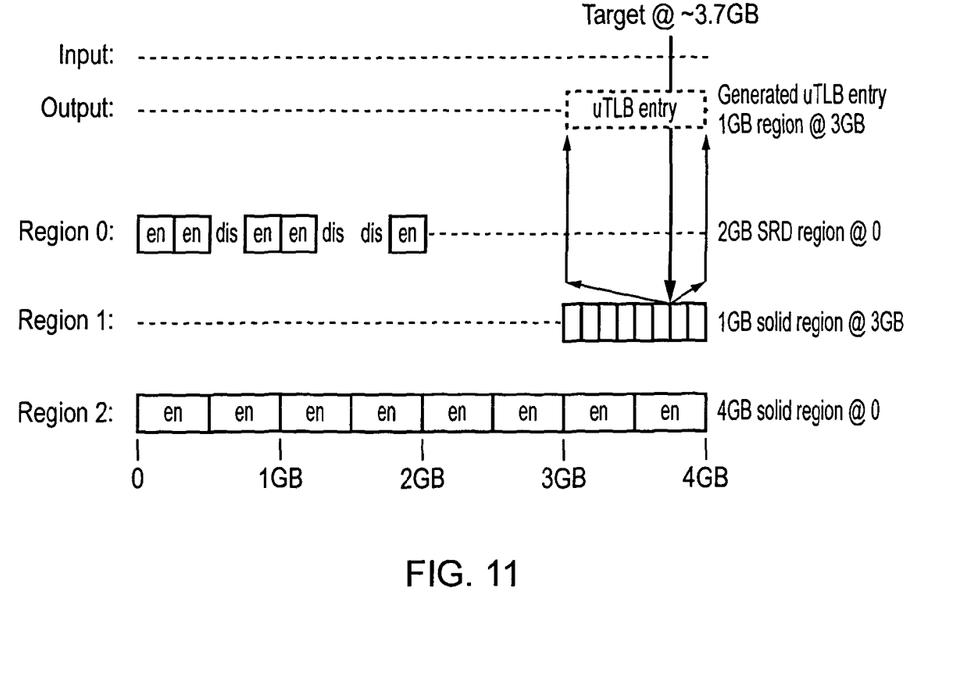
FIG. 11 schematically illustrates a hit within a region which is not overlapped.

In the example of FIG. 11 the target address is approximately 3.7 GB. In this example the non-overlap size associated with region 0 is 2 GB and the non-overlap size associated with region 1, which is the controlling region is 1 GB. Accordingly, the address range associated with the address control signal is returned for the target address at approximately 3.7 GB is 1 GB in size.

Figure 12:
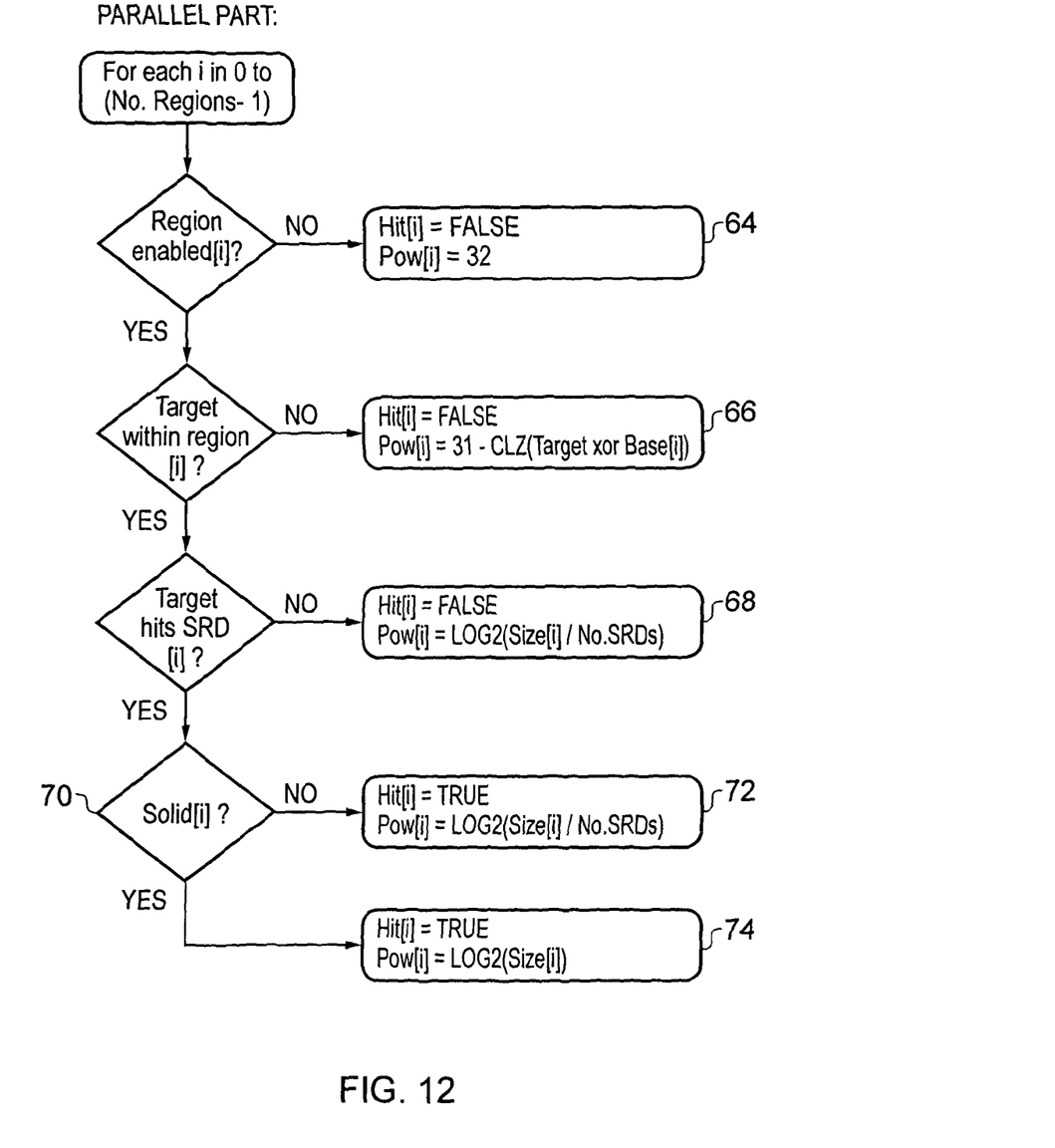
FIG. 12 schematically illustrates the determination of the non-overlap size for a given region with this process being performed in parallel for each of the regions.

FIG. 12 is a flow diagram illustrating determinations performed in parallel for each of the regions defined within the memory protection circuitry 10 for determining the non-overlap size to be associated with that region. Step 64 determines that when a region is disabled, then the non-overlap size should be the maximum memory address space size, in this case $2^X$ where X=32.

Step 66 corresponds to when the target address falls outside the region concerned and that region is enabled. In this case the non-overlap size to be associated with that region is determined to be $2^A$, where A is ((X−1)−CLZ) and CLZ is a count value of leading zeros within a determination of (TA XOR B*$2^W$). In this case X is the memory address bit width, the region has a size of $2^W$ and a base address of B*$2^W$ where W is a positive integer and B is a positive integer.

Step 68 determines the non-overlap size when the target address hits within an active select-region-disable (see FIG. 9). The region is divided into $2^S$ sub-regions and has a size of $2^W$. In this case, the non-overlap size is set to $2^W/2^S$.

Step 70 determines whether the region contains any sub-regions. If the region does contain sub-regions, then step 70 indicates that the region is the controlling region and returns a non-overlap size the same as is returned in step 68. If the determination at step 70 is that the region is not divided into sub-regions, then the signals returned indicate that the region is the controlling region and the non-overlap size associated therewith is $2^W$, i.e. the full size of the controlling region.

Figure 13:
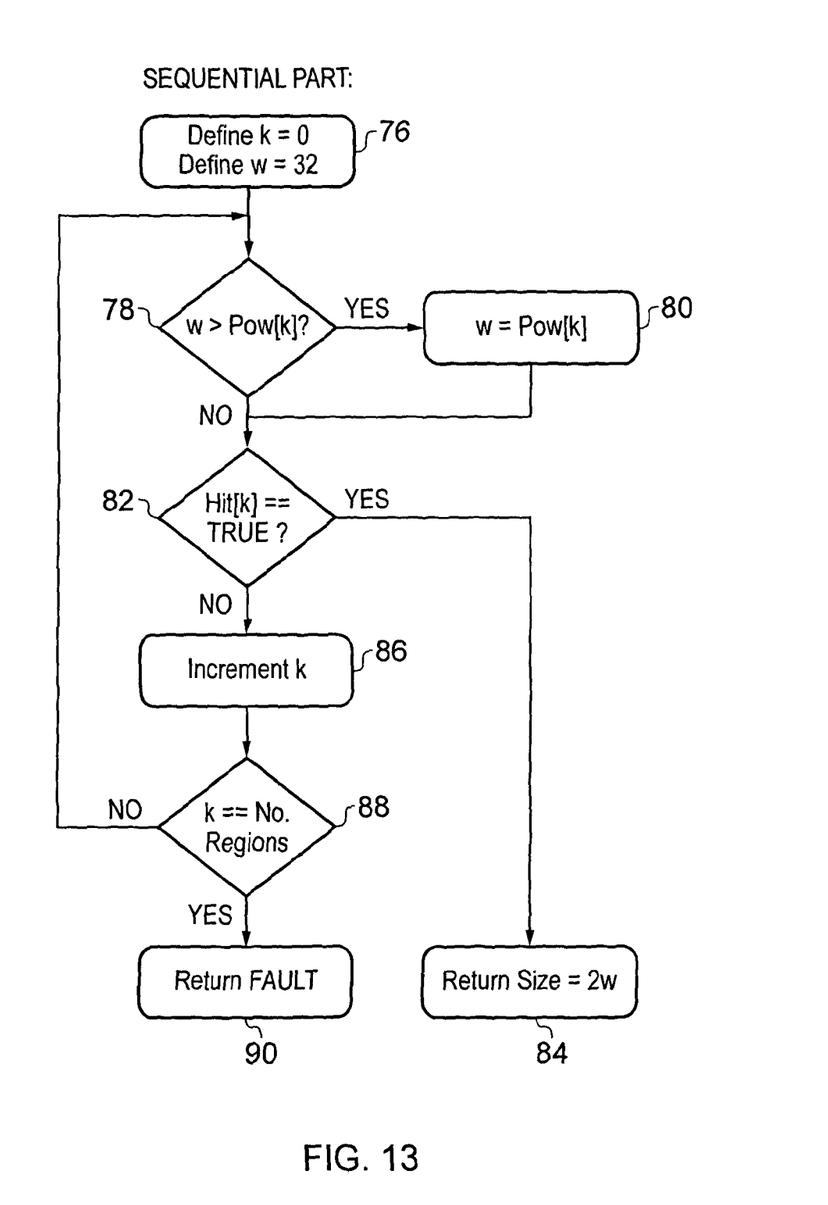
FIG. 13 is a flow diagram schematically illustrating how the non-overlap size to be used for determining a range of memory address space to be associated with access control data is determined from among a plurality of non-overlap sizes determined and returned from the process of FIG. 12.

FIG. 13 is a flow diagram illustrating sequential processing of the results of the parallel determinations performed for each region as illustrated in FIG. 12. At step 76 variables k and w are initialised with values 0 and 32 respectively. At step 78 a comparison is made between the current value of the variable w and the non-overlap size (subject to being reduced by taking a logarithm to base 2) so as to determine whether or not the current non-overlap size as indicated via the value of $W$ should be reduced as a smaller non-overlap size has been encountered. If the non-overlap size is to be reduced, then this is to be performed at step 80, otherwise processing proceeds directly to step 82. Step 82 determines whether or not the target address hits within the region concerned (i.e. the region concerned is the controlling region). If there is a hit, then processing proceeds to step 84 where the address range signals to be associated with the target address and the address control signals being returned is defined as $2^W$. The address range signals may be stored as the target address and a mask value as previously discussed.

If the determination at step 82 is that there is not a hit, then step 86 increments the value of k (selects the next region lower in the hierarchy to be considered). Step 88 determines whether the total number of regions present has been exceeded. If there are still regions to be considered, then processing returns to step 78. If the determination at step 88 is that the total number of regions present have all been considered and no hit has been detected at step 82, then a fault is returned at step 90. In some embodiments this fault may trigger the memory management circuitry 60 to determine access control signals for the target address concerned as the memory protection circuitry 10 is not storing region data controlling that target address.

The invention claimed is:

1. Apparatus for processing data comprising:
   memory protection circuitry configured to store access control data for a plurality of regions of memory address space within a memory, said plurality of regions having a hierarchical ordering there between, said memory protection circuitry:
   (i) determining, in response to a memory access request to a target memory address received by said memory protection circuitry, a controlling region within said plurality of regions, said controlling region having a highest position within said hierarchical ordering of any of said plurality of regions encompassing said target address; and
   (ii) returning access control data for said controlling region for controlling access to said memory by said memory access request; and
   an access control cache coupled to said memory protection circuitry and configured to store access control data returned from said memory protection circuitry and to provide said access control data for said memory access request in place of said memory protection circuitry when said access control cache is storing said access control data for said memory access request,
   wherein said memory protection circuitry when returning said access control data also generates:
   (a) a cachability signal indicative of whether or not said access control data is eligible to be stored in said access control cache; and
   (b) at least when said cachability signal indicates said access control data is eligible to be stored in said access control cache, address range defining signals for defining a range of memory address space within said memory for which said access control data controls access to said memory by memory access requests, and wherein said memory protection circuitry:

generates said cachability signal with a value indicating said access control is eligible to be stored in said access control cache when said controlling region does not encompass any memory addresses that are encompassed within one or more other regions of said plurality of regions having a higher position within said hierarchical ordering than said controlling region; and generates said cachability signal with a value indicating said access control is not eligible to be stored in said access control cache when said controlling region encompasses at least one memory address that is encompassed within one or more other regions of said plurality of regions having a higher position within said hierarchical ordering than said controlling region.

2. Apparatus as claimed in claim 1, wherein said memory protection unit is configured to store cachability data for each region of said plurality of regions, said cachability data indicating of whether or not access control data for said region is eligible to be stored in said access control cache, said memory protection unit generating said cachability signal for said controlling region in dependence upon said cachability data for said controlling region.

3. Apparatus as claimed in claim 2, wherein said memory protection circuitry includes analysis circuitry, said analysis circuitry determining said cachability data for each region of said plurality of regions.

4. Apparatus as claimed in claim 3, wherein said analysis circuitry is powered down when not determining said cachability data.

5. Apparatus as claimed in claim 3, wherein said analysis circuitry determines said cachability data asynchronously to said memory protection circuitry responding to received memory access requests.

6. Apparatus as claimed in claim 3, wherein said analysis circuitry is a non-programmable finite state machine circuitry.

7. Apparatus as claimed in claim 3, wherein said analysis circuitry compares each of region of said plurality of regions with, in turn, all other regions of said plurality of regions to determine said cachability data for said region.

8. Apparatus as claimed in claim 2, wherein said access control cache is flushed whenever any of said access control data stored by said memory protection circuitry is written.

9. Apparatus for processing data comprising:
memory protection circuitry configured to store access control data for a plurality of regions of memory address space within a memory, said plurality of regions having a hierarchical ordering there between, said memory protection circuitry being configured to:
(i) determine, in response to a memory access request to a target memory address received by said memory protection circuitry, a controlling region within said plurality of regions, said controlling region having a highest position within said hierarchical ordering of any of said plurality of regions encompassing said target address; and
(ii) return access control data for said controlling region for controlling access to said memory by said memory access request; and
an access control cache coupled to said memory protection circuitry and configured to store access control data returned from said memory protection circuitry and to provide said access control data for said memory access request in place of said memory protection circuitry when said access control cache is storing said access control data for said memory access request;

wherein said memory protection circuitry when returning said access control data also generates:
(a) a cachability signal indicative of whether or not said access control data is eligible to be stored in said access control cache; and
(b) at least when said cachability signal indicates said access control data is eligible to be stored in said access control cache, address range defining signals for defining a range of memory address space within said memory for which said access control data controls access to said memory by memory access requests; and
wherein:
said plurality of regions include one or more non-contiguous regions, each non-contiguous region encompassing a plurality discrete ranges of memory addresses; and
said memory protection circuitry generates said cachability signal with a value indicating said access control is not eligible to be stored in said access control cache when said controlling region is a non-contiguous region.

10. Apparatus as claimed in claim 9, wherein said cachability data is determined whenever any of said access control data stored by said memory protection circuitry is written.

11. Apparatus as claimed in claim 9, wherein address defining signals specify one of:
(i) a base address of said controlling region and a size of said controlling region; and
(ii) a base address of said controlling region and a mask value for applying to a memory address to determine in conjunction with said base address if said memory address is within said controlling region.

12. Apparatus as claimed in claim 9, comprising a cache memory configured to store program instructions from a main memory, said memory access request being a cache fetch from said main memory to said cache memory and said access control cache being coupled to said cache memory so as to provide said access control data for said cache fetch in place of said memory protection circuitry when said access control cache is storing said access control data for said cache fetch.

13. Apparatus as claimed in claim 9, wherein said apparatus operates in a plurality of hardware modes and said access control data indicates for each region of said plurality of regions data specifying in which of said plurality of hardware modes a memory access request to a memory address within said region is permitted.

14. Apparatus as claimed in claim 9, wherein said access control data indicates for each region of said plurality of regions data specifying in whether data within said region is one or more of: readable, writable and executable.

15. Apparatus as claimed in claim 9, further comprising memory management circuitry configured to read page table data stored in said memory to generate access control data for said memory access request when said memory protection circuitry is not able to generate said access control data, wherein said access control cache is configured to store access control data generated by said memory management circuitry.

16. Apparatus as claimed in claim 15, wherein said memory protection circuitry is not able to generate said access control data when one of:

(i) none of said plurality of regions encompass said target address; and (ii) said memory protection circuitry is disabled.

17. Apparatus for processing data comprising:

memory protection circuitry configured to store access control data for a plurality of regions of memory address space within a memory, said plurality of regions having a hierarchical ordering there between, said memory protection circuitry being configured to:

(i) determine, in response to a memory access request to a target memory address received by said memory protection circuitry, a controlling region within said plurality of regions, said controlling region having a highest position within said hierarchical ordering of any of said plurality of regions encompassing said target address; and (ii) return access control data for said controlling region for controlling access to said memory by said memory access request; and an access control cache coupled to said memory protection circuitry and configured to store access control data returned from said memory protection circuitry and to provide said access control data for said memory access request in place of said memory protection circuitry when said access control cache is storing said access control data for said memory access request;

wherein said memory protection circuitry when returning said access control data also generates address range defining signals for defining a range of memory address space within said memory for which said access control data controls access to said memory by memory access requests;

wherein said memory protection circuitry is configured to determine, for each of at least those of said plurality of regions having a higher position within said hierarchical ordering than said controlling region, a non-overlap size of said address range that will not overlap therewith;

wherein said target address is an X-bit address of value TA and each of said plurality of regions has a size of $2^W$ and a base address of $B*2^W$, where X is a positive integer, W is a positive integer, and B is a positive integer.

18. Apparatus as claimed in claim 17, wherein said memory protection circuitry is configured to determine in parallel said non-overlap size for each of said plurality of regions.

19. Apparatus as claimed in claim 17, wherein said range of memory address space is set to have a size corresponding to a smallest non-overlap size of any of said plurality of regions having a higher position within said hierarchical ordering than said controlling region.

20. Apparatus as claimed in claim 17, wherein if a region within said plurality of regions is not enabled, then said non-overlap size for said region is $2^X$.

21. Apparatus as claimed in claim 17, wherein if a region within said plurality of regions is enabled and said target address is not within said region, then said non-overlap size for said region is given by $2^A$, where A is ((X−1)−CLZ) and CLZ is a count value of leading zeros within (TA XOR $B*2^W$).

22. Apparatus as claimed in claim 17, wherein if a region within said plurality of regions is enabled, said region is contiguous and said target address is not within said region, then said non-overlap size for said region is $2^W$.

23. Apparatus as claimed in claim 17, wherein if a region within said plurality of regions is enabled and said region is divided into $2^S$ sub-regions each with a size $2^W/2^S$, where S is a positive integer, then said non-overlap size for said region is $2^W/2^S$.

24. Apparatus as claimed in claim 18, wherein said memory protection circuitry is configured to determine in parallel for each of said plurality of regions if said region is said controlling region for said target address.

25. Apparatus as claimed in claim 24, wherein said memory protection circuitry is configured to read in said hierarchical order results of said determinations in parallel until said results for said controlling region are read and to set said non-overlap size to a smallest non-overlap size of any of said regions for which said results are read.

26. Apparatus as claimed in claim 17, wherein said address range defining signals specify said target address and a mask value and said access control cache is configured such that a new target address is matched to stored access control data if said target address masked with said mask value for said stored access control data matches said new target address masked with said mask value for said stored access control data.

27. A method of controlling access to data comprising the steps of:

storing within memory protection circuitry access control data for a plurality of regions of memory address space within a memory, said plurality of regions having a hierarchical ordering therebetween;

determining with said memory protection circuitry, in response to a memory access request to a target memory address received by said memory protection circuitry, a controlling region within said plurality of regions, said controlling region having a highest position within said hierarchical ordering of any of said plurality of regions encompassing said target address;

returning from said memory protection circuitry access control data for said controlling region for controlling access to said memory by said memory access request;

storing within an access control cache coupled to said memory protection circuitry access control data returned from said memory protection circuitry; and providing said access control data for said memory access request from said access control cache in place of said memory protection circuitry when said access control cache is storing said access control data for said memory access request;

generating by said memory protection circuitry when returning said access control data:

(a) a cachability signal indicative of whether or not said access control data is eligible to be stored in said access control cache; and (b) at least when said cachability signal indicates said access control data is eligible to be stored in said access control cache, address range defining signals for defining a range of memory address space within said memory for which said access control data controls access to said memory by memory access requests;

wherein:

said plurality of regions include one or more non-contiguous regions, each non-contiguous region encompassing a plurality discrete ranges of memory addresses; and said memory protection circuitry generates said cachability signal with a value indicating said access control is not eligible to be stored in said access control cache when said controlling region is a non-contiguous region.

* * * * *